Sept. 8, 1964 J. V. BERTRAND 3,148,007

ELECTRONIC CHASSIS SUPPORTING MEANS

Filed Sept. 6, 1962 2 Sheets-Sheet 1

Sept. 8, 1964 J. V. BERTRAND 3,148,007

ELECTRONIC CHASSIS SUPPORTING MEANS

Filed Sept. 6, 1962 2 Sheets-Sheet 2

United States Patent Office 3,148,007
Patented Sept. 8, 1964

3,148,007
ELECTRONIC CHASSIS SUPPORTING MEANS

Joseph V. Bertrand, 59 Forest Ave., Verona, N.J.

Filed Sept. 6, 1962, Ser. No. 221,737
1 Claim. (Cl. 312—323)

This invention relates generally to the field of supporting or casing structure, and more particularly to improved forms of electronic chassis-supporting devices of the type which permit ready accessibility to all parts of the electronic structure. Devices of this type are generally known in the art, and the invention lies in specific constructional improvements permitting reduced cost of manufacture, greater facility in use, and greater mechanical strength of certain of the component parts consistent with lighter weight.

In devices of this type, it is customary to mount the chassis upon extensible track or rail means, somewhat resembling those used in a suspension-type filing cabinet, whereby the chassis may be directly withdrawn from an enclosing cabinet or wall. Once having arrived at an extended condition, pivotal means mounted on the outermost of the extensible track members permits the entire chassis to be rotated about a horizontally disposed pivotal axis, wherein all of the surfaces of the chassis may be selectively exposed to permit work to be done either above or below the plane of the chassis frame. To facilitate repair or other servicing, locking means is provided which permits the fixing of the chassis in any angular disposition, and after completion of such repairs and/or servicing, the locking means may be released to permit the chassis to be returned to a horizontal condition, subsequently locked in such condition, and moved inwardly into the cabinet or other enclosing area.

The principal disadvantage in prior art construction has been in the realm of manufacturing cost. Complicated latch mechanisms have been positioned in such manner that they are operated from that portion of the chassis which is pivoted, so that, while initially available, the latch mechanism becomes unavailable after the chassis has been rotated to a new position and subsequently locked. Normally, spring latches provide for automatic engagement, and, once engaged, where the release mechanism is not readily manually engageable, difficulty is experienced in bringing the chassis back to its original orientation.

Another disadvantage of prior art construction lies in the fact that the latches have been maintained in position through resilient means which are readily overcome by inertial forces encountered, for example, when the apparatus is mounted in an aircraft subject to violent maneuvers. Under sufficient gravitational or inertial forces, such locking mechanisms have been disengaged, permitting the relatively delicate electronic chassis to move with respect to the track members, and subsequently suffer damage upon contacting a relatively immovable object.

Another disadvantage of the prior art constructions lies in the fact that latching mechanisms used to secure the chassis in operational position have engaged the cabinet structure within which the chassis is positioned rather than the track members, necessitating heavier construction in the cabinet than is otherwise necessary, and the provision of an interrelating part on such structure to accurately engage such latching mechanism.

It is therefore among the principal objects of the present invention to provide improved structure of the class described in which the above-mentioned disadvantages have been substantially eliminated.

Another object of the invention lies in the provision of improved electronic chassis-supporting means in which the cost of manufacture, as compared to equivalent prior art devices, has been materially reduced.

Still another object of the invention lies in the provision of improved chassis construction of the class described in which the adjustment of the same during the repair of chassis components is materially facilitated.

Still another object of the invention lies in the provision of automatic means for locking the angular disposition of the chassis with respect to the track-forming members supporting the chassis upon the moving of the chassis element into a cabinet or other enclosing device.

Still another object of the invention lies in the provision of a number of universally adaptable components comprising the inventive structure, thereby permitting incorporation of such structure in a variety of forms without further modification.

A feature of the invention lies in the elimination of so-called "left-" and "right-" hand symmetrical members, thereby reducing the number of individual components comprising a complete device.

These objects and features, as well as other incidental ends and advantages, will more fully appear in the progress of the following disclosure, and be pointed out in the appended claim.

In the drawings, to which reference will be made in the specification, similar reference characters have been employed to designate corresponding parts throughout the several views.

Figures 1, 2, 3, 4, 5, 6, 11:
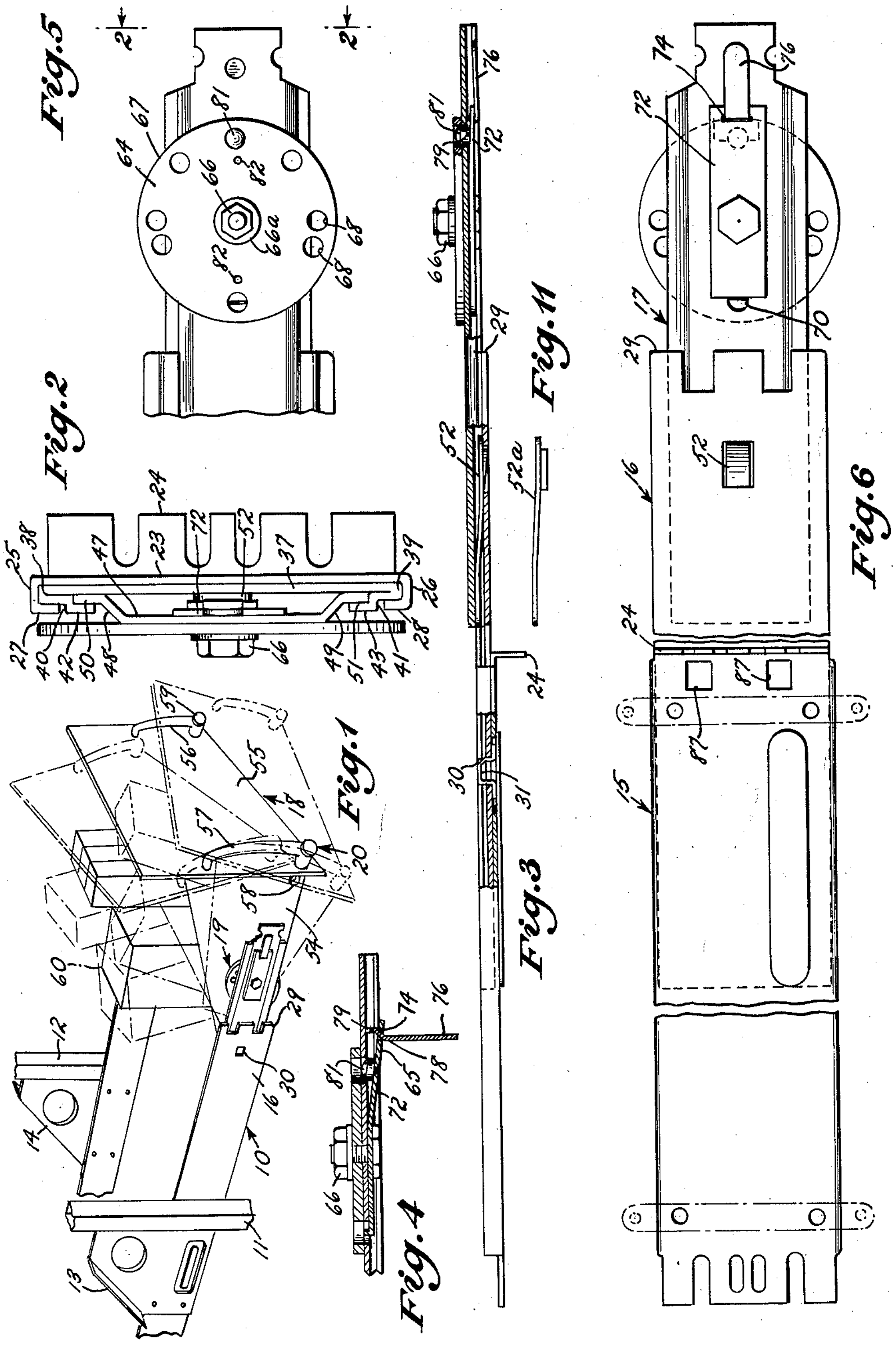
FIGURE 1 is a fragmentary view in perspective of a first embodiment of the invention.
FIGURE 2 is an end elevational view of a group of interconnected track-forming members, forming a part of the first embodiment.
FIGURE 3 is a central horizontal longitudinal sectional view of said track members as seen from the plane 3—3 in FIGURE 2.
FIGURE 4 is a fragmentary enlarged sectional view corresponding to the right-hand portion of FIGURE 3, and showing certain of the component parts in altered relative position.
FIGURE 5 is a fragmentary side elevational view corresponding to the upper portion of FIGURE 3.
FIGURE 6 is a fragmentary enlarged side elevational view corresponding to the lower portion of FIGURE 3.
FIGURE 11 is a fragmentary view in elevation showing an alternate form of construction.

In accordance with the invention, the first embodiment of the device, generally indicated by reference character 10, is shown in FIGURE 1 in interconnected relation with respect to a pair of vertical stanchions 11 and 12 forming a part of a cabinet (not shown), by means of interconnecting brackets 13 and 14. The device 10 comprises broadly: a pair of outer track elements 15, a pair of intermediate track elements 16, a pair of inner track elements 17, a chassis-engaging element 18, pivotal means 19, and locking means 20.

The outer track elements 15 are symmetrically disposed with respect to the principal longitudinal axis of the device, but are actually identical rather symmetrical in configuration, to reduce the number of operative parts which must be manufactured to constitute an entire device. Each element 15 includes a base wall member 23, one end of which is provided with an angularly disposed mounting flange 24. Disposed at the upper and lower edges of the base wall member 23 are an upper wall member 25 and a lower wall member 26, respectively, in turn interconnected with an upper track-forming member 27 and a lower track-forming member 28 to form a continuous track in which the intermediate track element 16, corresponding thereto, may be disposed. At the outer end 29 thereof there is provided a rectangular opening 30 to provide entrance means for well-known stops 31 which limit movement of the intermediate track element 16 with respect to the relatively fixed outer track element 15.

The intermediate track elements 16 are also identical, and are configured to be slidably disposed within the outer track element 15. Each includes a base wall member 37, upper and lower folded members 38 and 39, respectively, and upper and lower offset members 40 and 41, respectively, which are interconnected with upper and lower track-forming members 42 and 43. The folded members 38 and 39 are selectively disposed within the track formed by the outer track element 15, and the track-forming members 42 and 43 provide means for the engagement of the inner track elements 17.

The inner track elements 17 are also identical, each including a main wall member 47, upper and lower offset wall members 48 and 49, and track-engaging members 50 and 51 engaging the members 42 and 43. Resilient stop means 52 may be of well-known type adapted to be cammed out of engagement when the elements 16 and 17 are pushed to lie within the outer track member 15.

The chassis-engaging element 18 may be formed in such manner as to be a part of an electronic chassis, and preferably includes a pair of side plates, one of which is indicated by reference character 54, as well as an end plate or panel 55, the outer surface of which will normally be exposed. Mounted upon the plate 55 are a pair of handle members 56 and 57, each preferably incorporating locking means 58 and 59, the details of which will be subsequently described. Disposed behind the plate 55 and between the plates 54 is the electronic chassis 60, the particular details of which will depend upon the type of apparatus being installed, and which form no part of the present disclosure.

The pivotal means 19 includes an annular plate 64 and detent means 65, one each of which is associated with each of the inner track elements 17. As best seen in FIGURES 5 and 6, the plate 64 is arranged for rotation about a centrally disposed bolt 66, the same having a washer 66*a* rotating with the plate. Disposed inwardly from the peripheral edge 67 of the plate 64 are a plurality of holes 68 which are selectively engageable by the detent means 65 to predetermine a particular angular orientation of the chassis-engaging element 18 with respect to the outer track elements 15. The detent means 65 includes a flat spring member 72, one end of which engages a hole 70 in the element 17, to prevent axial rotation about the bolt 66. An opposite end 73 is provided with a transverse slot 74 in which there is movably disposed a jack member 75. The jack member 75 may be formed as a steel stamping, and includes a handle portion 76, an offset pivotal portion 78, and a contact portion 79, adapted to bear against the outer surface of the element 17. From a comparison of FIGURES 1 and 5, it will be apparent that elevating the handle portion 76 causes the contact portion 78 to jack outwardly the flat spring member 72 to disengage the projecting button 81 from one of the holes 68, whereby the plate may be rotated. The chassis-engaging element 18 is connected directly to the plate 64 through holes 82 (FIGURE 5) in well-known manner.

Figures 7, 8, 9, 10:
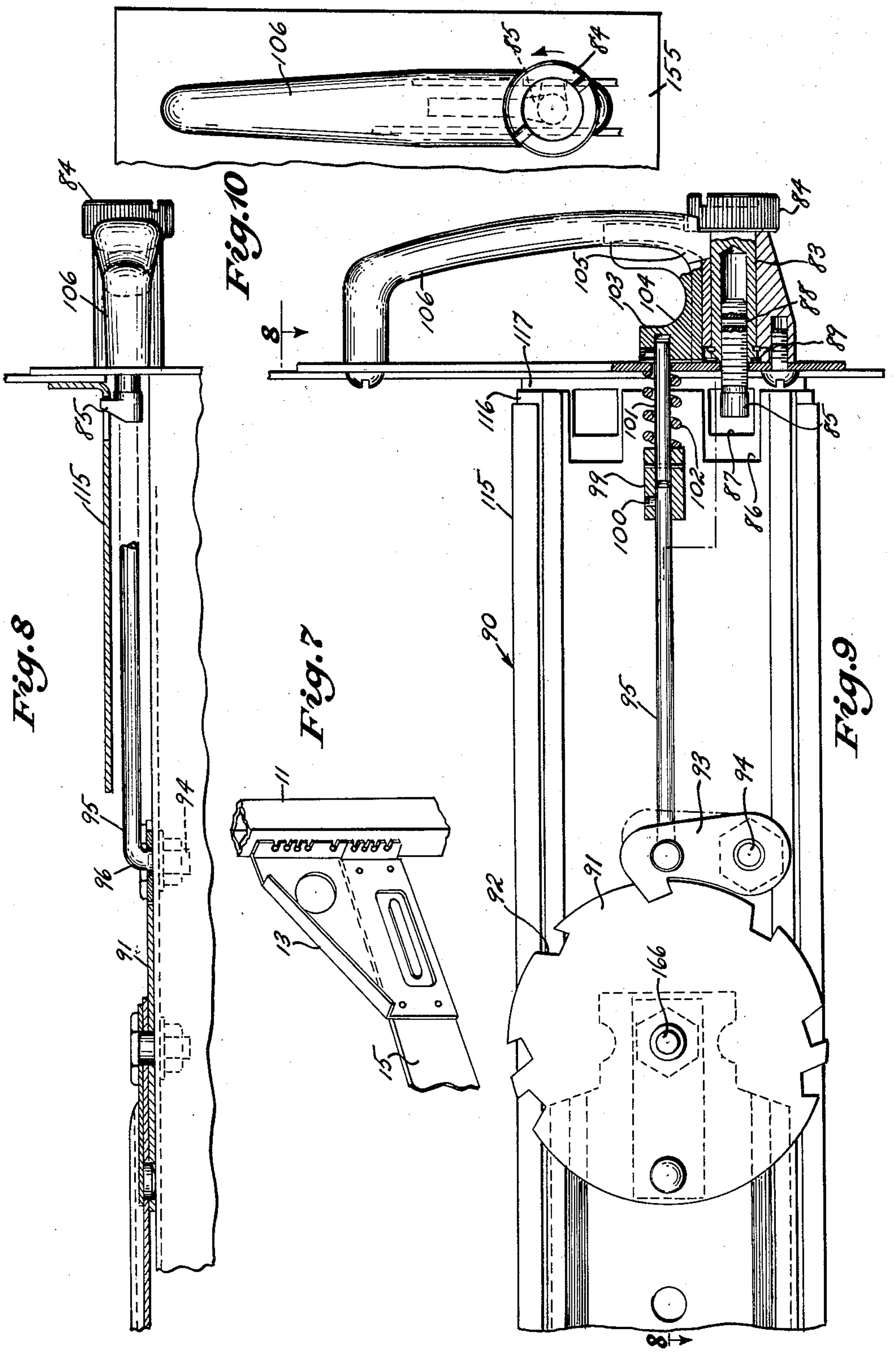
FIGURE 7 is a fragmentary enlarged view in perspective showing the interconnection of one of the track-forming elements comprising a part of the first embodiment, interconnected with a vertical supporting stanchion.
FIGURE 8 is a fragmentary horizontal sectional view as seen from the plane 8—8 in FIGURE 9.
FIGURE 9 is a fragmentary side elevational view, partly in section, of a second embodiment of the invention.
FIGURE 10 is a fragmentary side elevational view as seen from the plane 10—10 in FIGURE 9.

The locking means 20 provides for the maintenance of the device 10 in telescoped condition, at the completion of a servicing or repair operation. As best seen in FIGURE 9, it includes a tubular shaft 83 having an angular finger-engageable member 84. The shaft 83 is hollow and threaded, and engages a correspondingly threaded offset member 85 which projects through an opening or slot 86 in the intermediate track element 16 to engage a corresponding slot 87 in the outer track element 15. Axial rotation is assured by the contact of a friction member 88 and resilient washer 89 during this initial movement. Subsequent rotation of the member 84 causes relative movement between the above threaded portions, and withdraws the offset member 85 against the edge of the opening 87 to assure a rigid gripping action. It will be observed that, as contrasted with prior art devices, the engagement is directly upon the outer track element 15 rather than upon a portion of a cabinet, which may be made of correspondingly lighter materials since it does not absorb the stresses of maintaining the device in collapsed condition.

Turning now to the alternate form of construction seen in FIGURE 11, this construction differs from the principal form in the provision of a member 52*a* which must be manually depressed in order to move the device to telescoped condition, as compared with the principal construction in which the device is cammed open upon movement of the same to collapsed condition.

Turning now to the second embodiment of the invention, generally indicated by reference character 90, parts corresponding to those of the principal embodiment have been designated by similar reference characters with the additional prefix "1."

The second embodiment of the invention differs from the first embodiment in the provision of a circular plate 91 provided with peripheral notches 92 which coact with a pivotally mounted locking pawl 93 (see FIGURE 9). The pawl rotates about an axis through the bolt 94, and is moved into and out of engagement with the notches 92 by means of a pivotally mounted rod 95 (see FIGURE 8). The inner end 96 of the rod is headed over, and thus, when engaged within a corresponding opening in the pawl 93, needs no further means for maintaining the same in engagement. The outer end 98 engages a coupling 99 having a set screw 100 which interconnects the same with a connecting rod 101. A spring 102 bears against the coupling 99 and urges the pawl 93 to locking position. The outer end 103 of the connecting rod 101 engages a trigger member 104 engaged in a recess 105 in the handle member 106. In this embodiment, a more conventional type of means for locking the chassis against rotation is employed, but by placing part of it upon a rotational mounting, the possibility of inertial forces dislodging the means from engagement with the annular plate 164 is considerably reduced.

By contrast, it will be observed that in the case of the first embodiment, collapsing the track elements results in the contacting of the handle portion 76 by an edge of the intermediate track element 16, whereby the same is positively moved to inactive position, whereby the locking action resulting immobilizing the circular plate 64 is positively and automatically accomplished.

I wish it to be understood that I do not consider the invention limited to the precise details of structure shown and set forth in this specification, for obvious modifications will occur to those skilled in the art to which the invention pertains.

I claim:

In an electrical chassis-supporting means of the class described, having a plurality of extensible track elements and a chassis-engaging element pivotally mounted upon one of said track elements, the improvement comprising: improved means for locking said chassis-engaging element with respect to said track element including a plate pivotally mounted upon said track element, said plate having a plurality of locking openings therein, a resiliently urged button selectively engageable with one of said openings, movable means having a manually-engageable handle thereon for elevating said button to disengaged position, and means on another of said track elements lying in the path of travel of said handle member to contact the same and move it to inoperative position upon the telescoping of said plurality of track elements.

References Cited in the file of this patent

UNITED STATES PATENTS

| | | |
|---|---|---|
| 2,788,253 | Gussack | Apr. 9, 1957 |
| 2,809,085 | Fall | Oct. 8, 1957 |
| 2,809,086 | Fall | Oct. 8, 1957 |
| 2,856,450 | Padgett et al. | Oct. 14, 1958 |
| 2,987,364 | Fall | June 6, 1961 |
| 3,000,686 | Kobitter | Sept. 19, 1961 |